(12) United States Patent
Popp et al.

(10) Patent No.: US 8,683,226 B2
(45) Date of Patent: Mar. 25, 2014

(54) AUTOMATIC PROVISIONING IN MOBILE TO MOBILE PLATFORMS

(75) Inventors: Christopher Glen Popp, Winona, MN (US); Adam D. Dirstine, Rochester, MN (US)

(73) Assignee: Digi International Inc., Minnetonka, MN (US)

( * ) Notice: Subject to any disclaimer, the term of this patent is extended or adjusted under 35 U.S.C. 154(b) by 0 days.

(21) Appl. No.: 13/550,239

(22) Filed: Jul. 16, 2012

(65) Prior Publication Data

US 2014/0020061 A1   Jan. 16, 2014

(51) Int. Cl.
*H04L 29/06*  (2006.01)
(52) U.S. Cl.
USPC ........................................... 713/191; 713/155
(58) Field of Classification Search
USPC ................................ 713/175, 155, 156, 191
See application file for complete search history.

(56) References Cited

U.S. PATENT DOCUMENTS 7,707,405 B1 *   4/2010   Gilman et al. ................. 713/156
2004/0093499 A1 *   5/2004   Arditi et al. .................... 713/176

* cited by examiner

*Primary Examiner* — Edward Zee
(74) *Attorney, Agent, or Firm* — Fogg & Powers LLC (57) ABSTRACT

Systems and methods for automatically provisioning devices that do not include or cannot provide a unique hardware identifier over a machine-to-machine network. A device or application may provide a server with a non-unique provisioning identifier during restricted communication between the server and the device. In response to receiving a provisioning identifier from a device, a server may generate a globally unique device identifier associated with the provisioning identifier for the individual device, and transmit the unique identifier to the device. The device may retain the unique identifier for future transactions. A request may be provided to a user, at the device, the server or any other interface, requesting that a newly identified device be authenticated. Upon authentication the device may communicate with the server with additional interactions that were not provided after provisioning and before authentication.

18 Claims, 5 Drawing Sheets

AUTOMATIC PROVISIONING IN MOBILE TO MOBILE PLATFORMS

TECHNICAL FIELD

This document pertains generally to automatic machine-to-machine device provisioning, and more particularly, but not by way of limitation, to uniquely identifying devices that do not provide a unique identifier for automatic provisioning.

BACKGROUND

Managing the provisioning process for devices in machine-to-machine (M2M) platforms can be a complex problem. Generally, a client that includes a processor may include a unique hardware identifier (ID). The processor may provide the ID to a software application that may communicate over a network with a server. ID may be installed in the processor or another portion of the hardware in client during the manufacture of client.

Making use of the unique hardware identifier requires tracking identifier information and later associating the unique hardware identifier of the client with a customer. This process can be cumbersome and may not be possible in situations where a software application developer does not have control of or access to the client when the device being designed or manufactured, or if the ID during device operation. An example of provisioning of wireless devices is described in U.S. Application Publication No. 2011/0004549 by Gray et al.

If the mapping is not maintained, client devices are effectively lost, and a server may not be able to properly provision the device in the M2M platform. Additionally, because the identifier is unique per device, a server either needs some scheme to obtain the identifier based on information from the device (e.g., a factory programmed Media Access Control (MAC) address), or the server must generate and install the identifier in real time such that the server can re-identify the device at a later time. These approaches can break down in situations where there is nothing in the device to generate a unique identifier from, or there is no access mechanism to program a unique value into the device.

OVERVIEW

Automatic provisioning processes for devices in machine-to-machine (M2M) platforms that include providing a provisioning identifier that may be utilized with multiple devices. An individual client device (e.g., a smart phone, laptop, tablet computer, etc.) may provide a non-unique provisioning identifier to a server (e.g., any second computing device), and in response the server may generate a unique identifier for the individual client device. The initial communication between the server and the individual client device may be conducted in a restricted communication mode that may limit the device's ability to access data on the server. This limit may remain in place until the device is authenticated. Once authenticated, the individual client device with its unique identifier may then transact authorized communication with the server, and may access any appropriately authorized data on the server.

Automatic provisioning may be performed on a per application basis in a M2M platform to dynamically generate device identifiers for individual devices. Restricted access for any unauthenticated application at the server can eliminate the need for a device to be preprogrammed with a unique identifier or for a server to maintain a mapping between individual devices and applications or users.

The server may prompt the device to request authentication information (e.g., an authentication code, an e-mail address, a username, or a password) to verify ownership or establish a user identity. Upon receipt of the authentication information the server may remove any limits on communication that were in place to prevent an unknown or unauthorized device from accessing information at the server.

A mechanism that may notify individuals (e.g., users, customers, or application developers) of new devices that provides the individual's provisioning identifier to a server. The notification may be made without relying on an out of band mechanism.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An example client that includes a processor and a unique hardware identifier (ID) may be uniquely identified in a machine-to-machine (M2M) platform. In an environment where multiple clients may communicate with the server, communication between each client and the server over a network may be coordinated or managed by uniquely identifying each client that communicates with the server with its unique hardware ID.

For example, by installing and utilizing a unique hardware ID in the client each individual client may be tracked. A mapping between the unique hardware identifiers and an instance of a client device, along with info on who owns the device or any other device related information, may be maintained at the server. Maintaining an association mapping between a device's unique hardware identifier and any customer, user, owner, or other information may require maintenance and updates to ensure accuracy. However, in situations where it is not possible to generate a unique identifier from information on a hardware device, or when there is no access to program a persistent unique value in the device during the manufacturing process, a client may not be able to unique identify itself to a server when establishing communication over at network.

For example, multiple application developers may each desire to provide their device applications to a central application portal or marketplace (e.g., the Tucows® website, the Apple® App Store℠, or the Android® Market). Application developers may not have access to, or desire to utilize, hardware identifiers that are unique to each device. However, the application developers may still wish to identify or track individual devices. For example, an application developer may wish to associate a specific device with a specific customer's account when the customer installs an application on a device. Therefore, there is a need for a scheme to provision and track devices when the device is not able to initially provide a unique device identifier.

Figure 1:
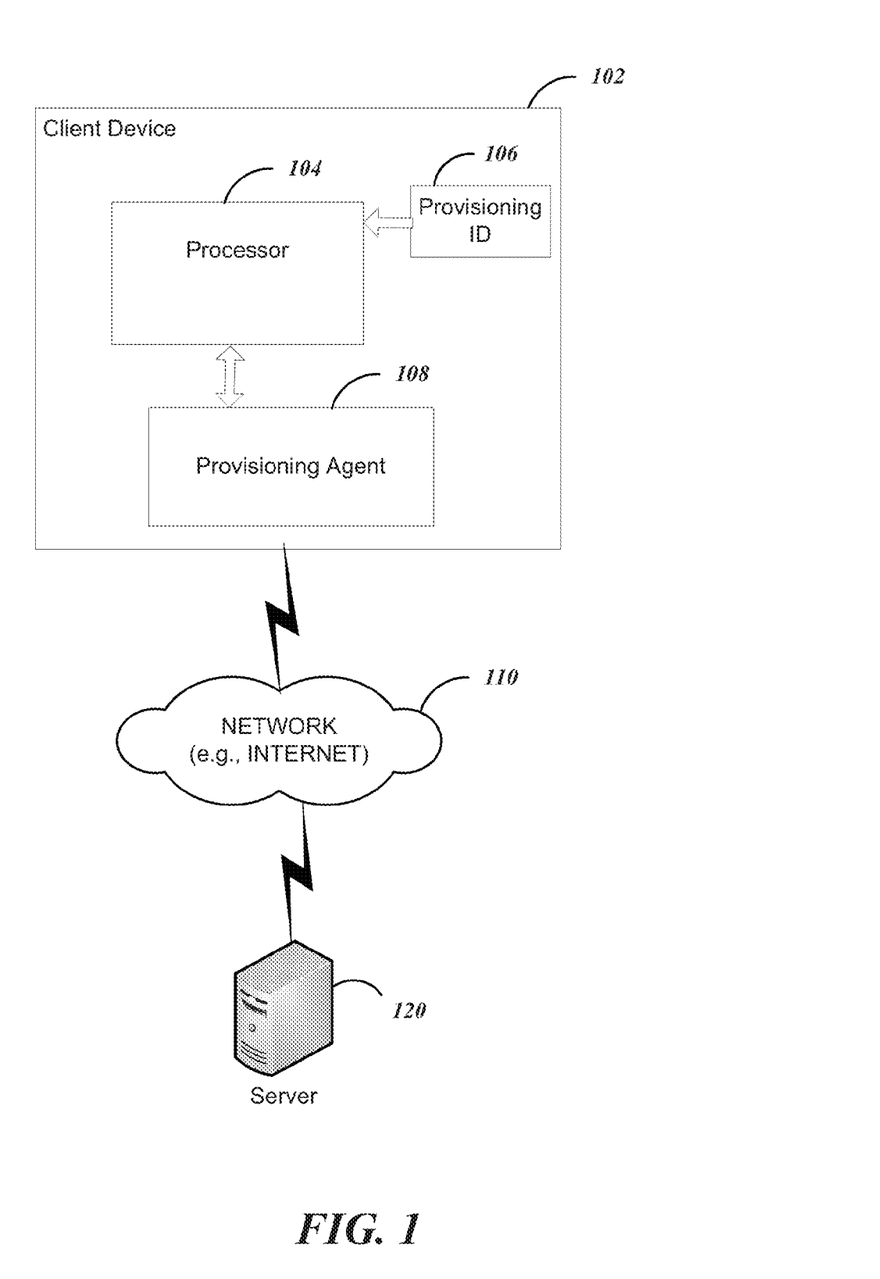
FIG. 1 illustrates a block diagram of an example client device including a provisioning agent in communication with a server, according to an embodiment.

FIG. 1 illustrates a block diagram of an example client device including a provisioning agent in communication with a server. The example client device 102 may included a provisioning identifier 106, a provisioning agent 108. The provisioning identifier 106 may include any data or code, such as an alpha numeric sequence, that may be communicated by the client device 102. Provisioning agent 108 may include any module or software application that is operable to be executed by the processor 104 of the device. For example, the provisioning agent 108 may include standalone applications or portions of an operating system that is embedded in the client device 102. A standalone application may include an application that is installed on the client device 102 during manufacturing, or an application that is delivered to and installed on the device at a later time.

For example, an application program with an embedded M2M client that is to be distributed on a commercial application portal may not have access to information from the operating system to generate a unique value. When separate instances of the same application program are downloaded from the commercial application portal by multiple devices it may not be possible to install a unique identifier in the application program that is associated with a specific hardware device.

The client device 102 may communicate utilizing any available network protocol over a network 110 (e.g., a private intranet, the Internet, etc.) with a server 120. The client device 102 may lack any uniquely identifying information. Alternatively, if a hardware portion (e.g., processor 104) includes a unique identifier, other modules (e.g., provisioning agent module 108, or an alternative software application) may not be able to access or communicate the unique identifier due to limitations enforced by the hardware or operating system of the client device 102.

In an example, identification and mapping of devices that do not include a unique identifier, or mapping devices by applications on the device that do not have access to a unique identifier, may be accomplished by automatically provisioning a unique identifier to each device upon its initial communication with another device (e.g., a server) over a network. A client device 102 connecting to any M2M platform may provide any other device in the platform with a provisioning identifier. The provisioning identifier does not need to be unique to the device. An other device (e.g., server 120) may receive the provisioning identifier supplied by the device and provision the device into a special restricted account that may limit the communications with the device until the client device 102 is authenticated.

Figure 2:
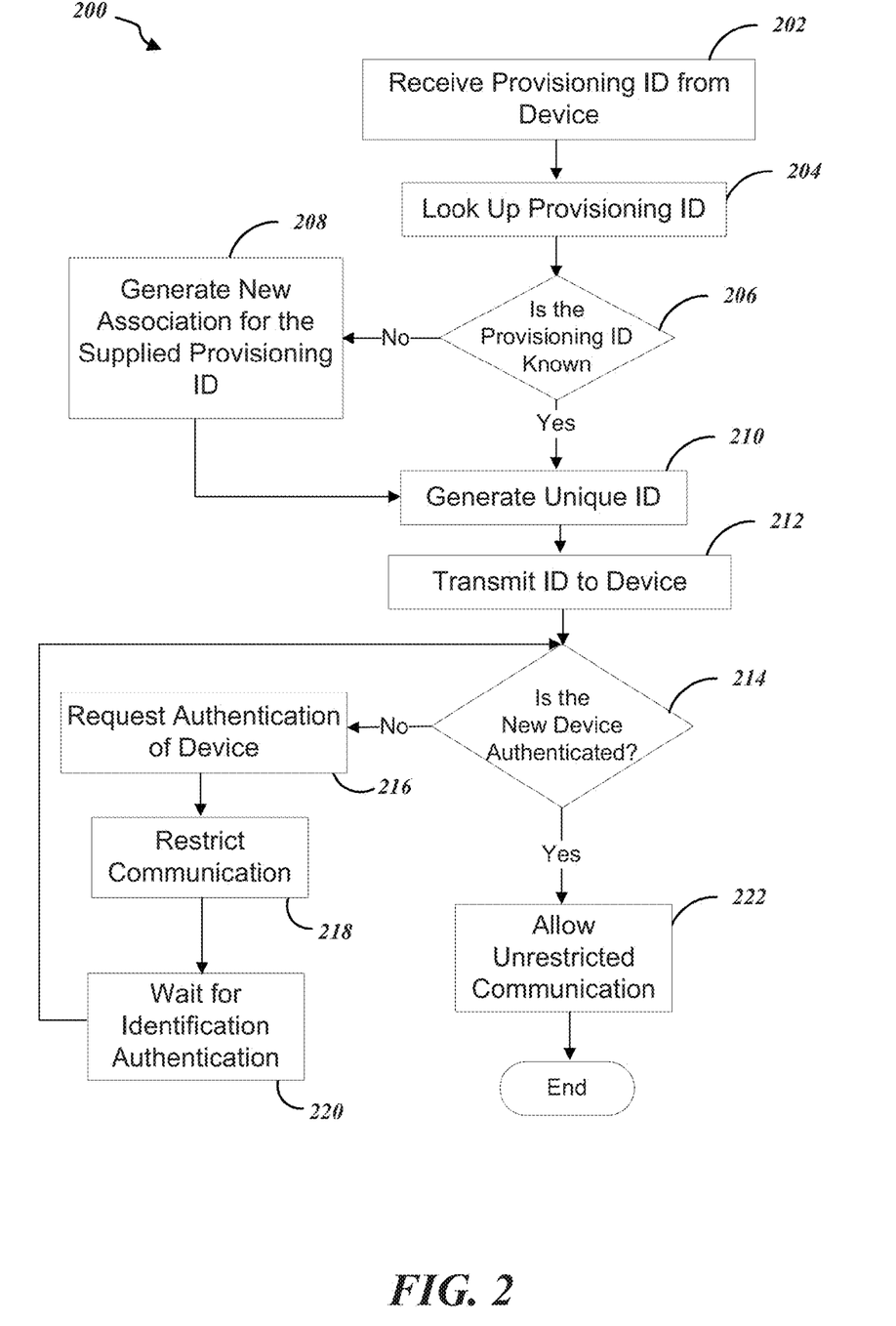
FIG. 2 illustrates a flow diagram of an example device provisioning scheme, according to an embodiment.

FIG. 2 illustrates a flow diagram of an example device provisioning scheme 200, according to an embodiment. Generally, instead of sending a unique identifier generated by a device attempting to join a M2M platform, the device initiates communication by providing a provisioning identifier. A provisioning identifier may be an application developer's unique number, code, or signature that is embedded in an application on the device. When writing an application the application developer may include their provisioning identifier in their applications such that each device running the application is aware of the provisioning identifier.

At 202, a server in the M2M platform may receive a provisioning identifier from a device that is attempting to join the platform or initiate communications with the server. At 204, the server may attempt to look up the provisioning identifier in a database or look-up table to determine, at 206, if an application developer identifier or other information is associated with the provisioning identifier. If there is no information associated with the supplied provisioning identifier, at 208, a new association is generated for the device. The new association may act as a temporary place holder until an existing application developer, customer, or end-user data is assigned to the provisioning identifier.

At 210, a unique identifier is created for the device that supplied the provisioning identifier to the server. The unique identifier may be globally unique to the device, such that no other device that connects to the M2M platform will be assigned the unique identifier. At 212, the server returns the generated identifier to the device. The device or an application operating on the device may store and use the unique identifier for subsequent connections or communication with the server.

A unique identifier may include or be associated with the provisioning identifier. For example, a provisioning identifier may include a thirty-two bit binary code, while an associated sixty-four bit provisioning identifier may include both the thirty-two bit binary code and an additional thirty-two bit sequence number. At 214 the server may check to determine if the device is authenticated. For example, an application developer may be notified of the new device that has provided the application developer's provisioning identifier to the server. In an example, the application developer may configure the server to automatically authenticate the device and exit restricted mode, allowing the device to commence fully interacting with the server.

In an example, at 216, the server may request authentication of the newly provisioned device. At 218 the server may limit an unauthenticated end device to a restricted set of communication interactions with the server until it is authenticated. For example, restricted communication is a mode that devices can be placed into at the server. When in a restricted mode, the type and quantity of messages exchanged between the device and server may be limited. When in restricted mode, the device may be allowed to send up a limited set of data, which may be accessible to the customer owning the device. The data will be stored in a special manner such that it will not interfere with any other device on the platform or server, but will be retrievable by the customer owning the device. The device may be required to supply the server with additional identifying information through a restricted data upload mechanism. At 220, the server may wait until the additional identifying information is received to authenticate the device.

In response to the receipt and validation of the identifying information from a device, at 222, the server may then authenticate the device and allow unrestricted communication with the device. This process could be manually performed by a user, or automated through notifications and web services with the customer's applications. In this manner devices lost in the mapping may be found, and manually handled. A device is not automatically added into a customer's account without authentication by an end user of the device.

Figure 3:
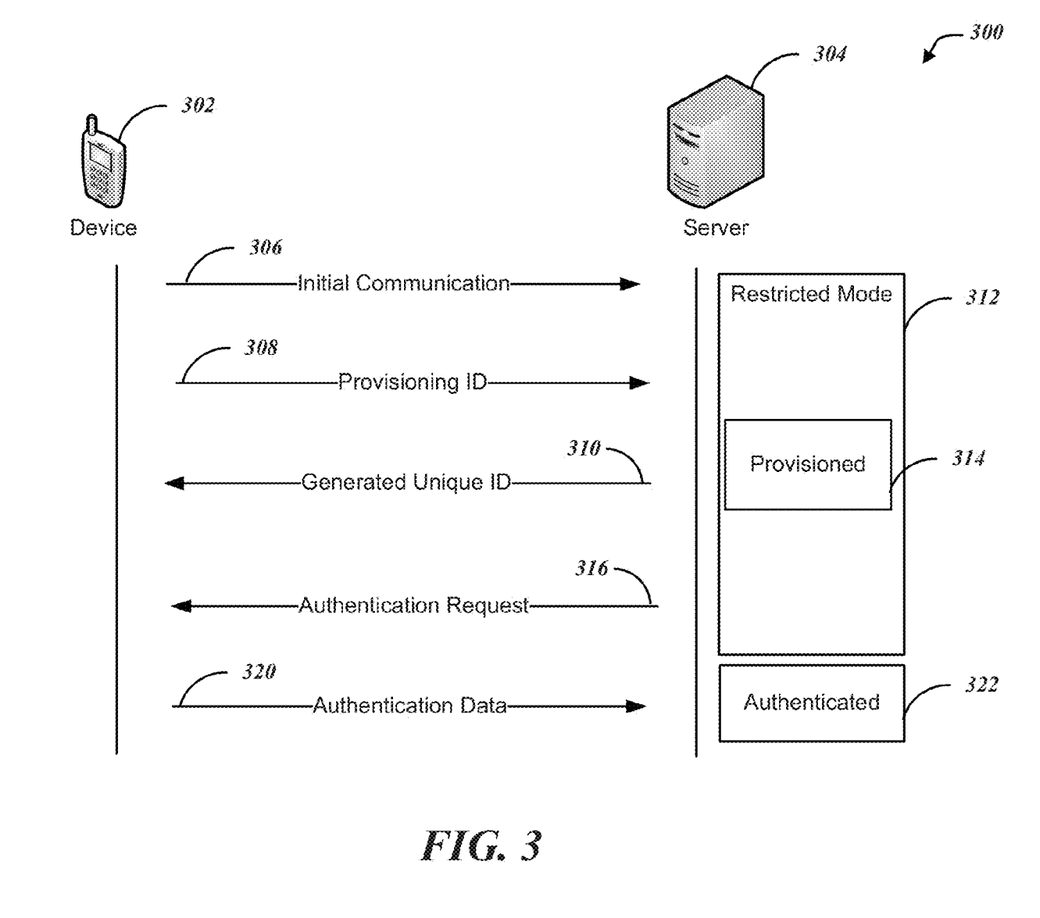
FIG. 3 illustrates an interaction diagram between a client device and a server, according to an embodiment.

FIG. 3 illustrates an interaction diagram 300 between a client device 302 and a server 304, according to an embodiment. At 306, the client device 302 initiates a connection with a server 304. The connection initiation from the client device 302 may, for example, be generated by an application that a user has downloaded onto client device 302 from an on-line application repository, or a worker configuring the device in an assembly or test environment. At 308, the client device 302 may spontaneously provide the server 304 with a provisioning identifier based on an interaction between the client device 302 and the server 304, or at the direction of an application running on the client device 302. The provisioning identifier may include a device specific hardware identifier or a non-unique identifier encoded in an application that is executing on the client device 302. The server may limit further communication with the client device 302 by categorizing the device as a unauthenticated device that is only allowed to communicate in a restricted mode 312. The server 304 may maintain the client device 302 in the restricted mode 312 even after the client device 302 is provisioned 314 by being assigned a unique identifier.

At 316, the server may transmit an authentication request to the client device 302. In this manner the server 304 may attempt to check the identity of the client device 302 or the device's user. In response, the client device 302 may respond with authentication data that may be supplied to the device by the device's user or an assembly worker configuring the device. Upon receipt and confirmation, if any, of the authentication data the server may treat the device as being authenticated 322 and remove any limits of the restricted mode 312. For example, client device 302 may not be able to access data or media associated with a client account or database until the client device 302 is authenticated. Once the client device 302 is authenticated it may be allowed to access the data or media associated with the client account or database with, or without, further authentication of the user in possession of the client device 302.

In an example, a user may download an application from an application repository or otherwise initiate an application service on a device. The application on first use may attempt to contact a server associated with or operated by the application's developer or a service provider. The server may be configured to provide additional content or services to the user through the application running on the device. As part of the initial contact with the server, the application may provide a non-unique provisioning identifier to the server. The non-unique provisioning identifier may include, for example, the application name and version number, any device information available to the application, or any other identifying information available to, or contained in, the application. The identifying information may not identify the device uniquely in all cases. By providing a known, but non-unique, provisioning identifier to the server the device may be allowed to access some, but not all services that may be available on the server. For example, a device may be limited to further authentication communication, or to only access publicly available data on the server.

In response to communication from a device, the server may utilize the provisioning identifier to generate a unique identifier assigned to the device, and transmit the unique identifier to the device, Alternatively, the server may prompt the user to enter authentication information such as a user-id and password, or other identifying information such as a code provided to the user via an e-mail from the server. Upon receipt of the authentication information and provisioning identifier from the device, the server may generate the unique identifier, or further associate the device with a user-account on the server associated with the authentication information. Upon authentication of the device the server may allow the device to access resources, media, or content on the server that may have been unavailable to the device prior to authentication.

Figure 4:
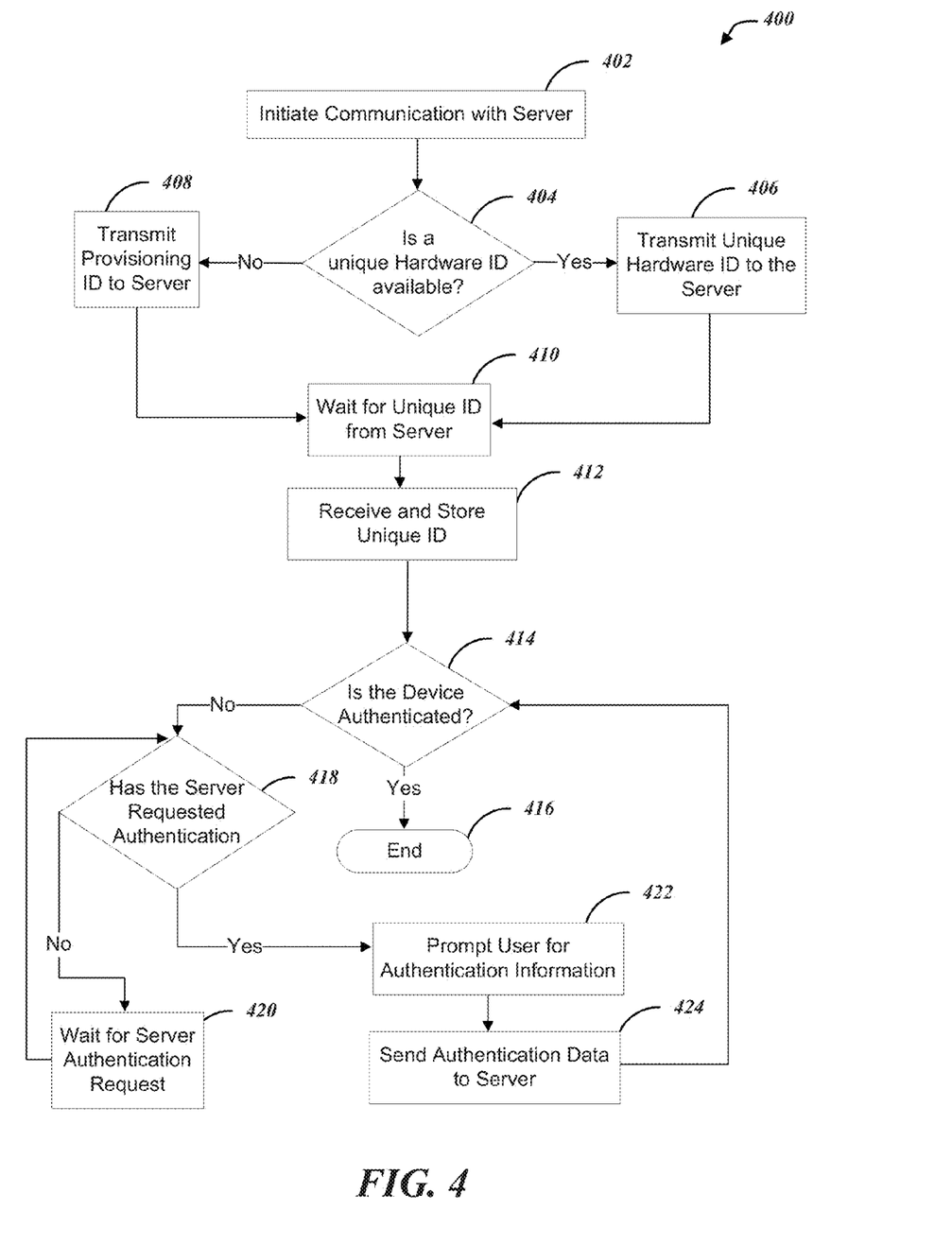
FIG. 4 illustrates a flow diagram of an example device provisioning scheme, according to an embodiment.

FIG. 4 illustrates a flow diagram of an example device provisioning scheme 400, according to an embodiment. At 402, a device, or application operating on a device, may initiate a communication session with a server. At 404, a determination is made if a unique hardware identifier is available from the device. The unique hardware identifier may include, for example, any physical attribute or programmed code stored in a non-volatile memory location on the device.

If a unique hardware identifier is available, at 406, the unique hardware identifier is transmitted to the server. If a unique hardware identifier is not available, at 408, a provisioning identifier is transmitted to the server. A provisioning identifier may include, for example, an application developer identifier that may be included in an application program operating on the device or in a separate memory location in the device. The same provisioning identifier may be included in multiple instances of one or more device types. For example, a single application that is loaded into the memory of multiple device may all share a common provisioning identifier.

At 410, the device may wait for a unique identifier to be returned to the device from the server. At 412, upon receipt of the unique identifier, the unique identifier is stored, for example, in a non-volatile memory location on the device where it may be retrieved for use in initiating subsequent communication sessions.

At 414, the device may inquire of the server, or determine from messages already received from the server, if the device is authenticated. An authentication message may be received from the server along with the unique identifier, or it may be received as part of a separate communication. If the device is authenticated, at 416, the provisioning process is complete and the device may communicate with the server.

If the device is not authenticated, at 418, the device may check if the server has requested additional authentication information. The device may wait, at 420, until an authentication request is received from the server. If the server has requested authentication information, at 422, the device may prompt a user of the device to enter authentication data.

Authentication data may include, for example, an alphanumeric code that was provided to the user by the server, or a username and password combination that the user has established with the server. Once the user has entered the authentication information into the device, at 424 the device may transmit the authentication data to the server and recheck for authentication with the server at 414.

In an example, the server may wait for the server to request authentication at 418, as depicted in FIG. 4. In an alternative example, the device may proactively prompt the user for authentication information at 422. The device may prompt the user before or after the device receives the unique identifier at 412. Once the user has entered the authentication information into the device, at 424, the device may transmit the authentication data to the server and recheck for authentication with the server at 414.

Figure 5:
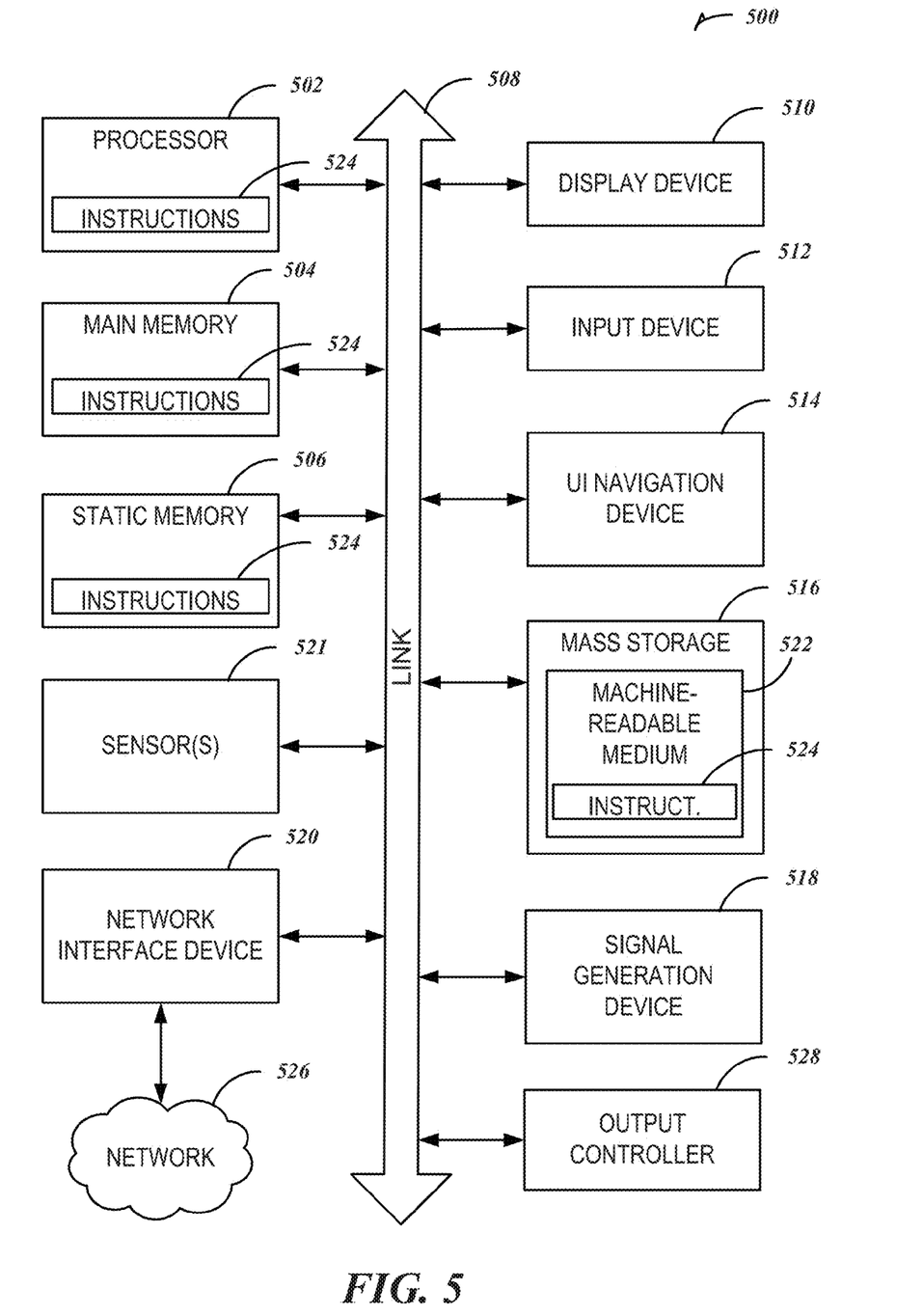
FIG. 5 illustrates a block diagram of an example machine upon which any one or more of the techniques discussed herein may be performed.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a processing unit, a graphics processing unit (GPU), a hardware processor core, or any combination thereof), a main memory 504, and a static memory 506, some or all of which may communicate with each other via a link 508 (e.g., a bus, link, interconnect, or the like). The machine 500 may further include a display device 510, an input device 512 (e.g., a keyboard), and a user interface (UI) navigation device 514 (e.g., a mouse). In an example, the display device 510, input device 512, and UI navigation device 514 may be a touch screen display. The machine 500 may additionally include a mass storage (e.g., drive unit) 516, a signal generation device 518 (e.g., a speaker), a network interface device 520, and one or more sensors 521, such as a global positioning system (GPS) sensor, camera, video recorder, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage 516 may constitute machine readable media.

While the machine-readable medium 522 is illustrated as a single medium, the term "machine readable medium" may include a single medium or multiple media (e.g., a centralized or distributed database, and/or associated caches and servers) that configured to store the one or more instructions 524.

The term "machine-readable medium" may include any tangible medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Various Notes & Examples

Example 1 can include or use subject matter (such as an apparatus, a method, a means for performing acts, or a device readable medium including instructions that, when performed by the device, can cause the device to perform acts), such as can include or use a method for automatically provisioning a device comprising:

receiving a provisioning identifier from the device at a server, the device and the server both being coupled to a network; restricting communication between the server and the device to a first set of interactions necessary to provision the device; generating a unique identifier associated with the provisioning identifier for the device; and transmitting the unique identifier to the device.

Example 2 can include, or can optionally be combined with the subject matter of Example 1, to optionally include notifying a user about the device as a result of the generation of the unique identifier.

Example 3 can include, or can optionally be combined with the subject matter of Example 2, to optionally include requesting authentication information from a user for the device; receiving authentication information about the device from the user at the server; and in response to receiving the authentication information, allowing communication between the server and the device that includes a second set of interactions, the second set of interactions including at least the first set of interactions.

Example 4 can include, or can optionally be combined with the subject matter of one or any combination of Examples 1 through 3 to optionally include receiving, at the server, an initial communication including the provisioning identifier.

Example 5 can include, or can optionally be combined with the subject matter of one or any combination of Examples 1-4 wherein the device had not previously communicated with the server prior to the initial communication.

Example 6 can include, or can optionally be combined with the subject matter of one or any combination of Examples 1-4 wherein the device cannot provide uniquely identifying information.

Example 7 can include, or can optionally be combined with the subject matter of one or any combination of Examples 1-4 wherein the device lacks uniquely identifying information.

Example 8 can include or use subject matter (such as an apparatus, a method, a means for performing acts, or a device readable medium including instructions that, when performed by the device, can cause the device to perform acts), such as can include or use a machine-to-machine provisioning system comprising: a server coupled to a network; and a plurality of devices configured to communicate over the network, each of the plurality of devices including a common provisional identifier and a provisioning module configured to communicate with the server; the server being configured to: restrict communication between the server and the device to a first set of interactions necessary to provision or authenticate the device, generate a unique identifier for an individual one of the plurality of devices in response to receiving the common provisional identifier from the individual device, and transmit the unique identifier to the individual device, and request authentication of the individual device from a user.

Example 9 can include, or can optionally be combined with the subject matter of Example 8, to optionally include the server configured to generate the unique identifier in response to an initial communication from the individual one of the plurality of devices including the provisioning identifier.

Example 10 can include, or can optionally be combined with the subject matter of Examples 8 or 9, to optionally include the server configured to notify a user about the device as a result of the generation of the unique identifier.

Example 11 can include, or can optionally be combined with the subject matter of Example 10, to optionally include the server configured to: receive authentication information about the device from the user at the server; and in response to receiving the authentication information, allow communication between the server and the device that includes a second set of interactions, the second set of interactions including at least the first set of interactions.

Example 12 can include, or can optionally be combined with the subject matter of one or any combination of Examples 8 through 11 wherein the plurality of devices cannot provide uniquely identifying information.

Example 13 can include, or can optionally be combined with the subject matter of one or any combination of Examples 8 through 12 wherein the plurality of devices lack uniquely identifying information.

Example 14 can include or use subject matter (such as an apparatus, a method, a means for performing acts, or a device readable medium including instructions that, when performed by the device, can cause the device to perform acts), such as can include or use a method for distributing computer readable software to multiple devices, comprising: providing a software application to a server, the server being coupled to a network and configured to provide the software application to a plurality of client devices over the network, the instance of a software application including a provisioning identifier; receiving a provisioning request from the software application executing on an individual client device, the provisioning request including the provisioning identifier; generating a unique identifier for the individual client devices in response to the provisioning request from the individual client device; providing the unique identifier to the individual client device; and requesting an authentication of the individual client device.

Example 15 can include, or can optionally be combined with the subject matter of Example 14, wherein the plurality of client devices cannot provide uniquely identifying information.

Example 16 can include, or can optionally be combined with the subject matter of Examples 14 or 15, wherein the plurality of client devices lack uniquely identifying information.

Example 17 can include, or can optionally be combined with the subject matter of one or any combination of Examples 14 through 16 wherein the software application cannot access uniquely identifying information in the plurality of client devices.

Example 18 can include or use subject matter (such as an apparatus, a method, a means for performing acts, or a device readable medium including instructions that, when performed by the device, can cause the device to perform acts), such as can include or use a tangible computer readable medium comprising a plurality of instructions that in response to being executed on a computing device, cause the computing device to: receive a provisioning identifier from the device, the device and the server both being coupled to a network; restrict communication between the server and the device to a first set of interactions necessary to provision the device; generate a unique identifier associated with the provisioning identifier for the device; and transmit the unique identifier to the device.

Example 19 can include, or can optionally be combined with the subject matter of Example 18, to optionally include a plurality of instructions that in response to being executed on a computing device, cause the computing device to: notify a user about the device as a result of the generation of the unique identifier.

Example 20 can include, or can optionally be combined with the subject matter of Examples 18 or 19, to optionally include a plurality of instructions that in response to being executed on a computing device, cause the computing device to: request authentication information from a user for the device; receive authentication information about the device from the user at the server; and in response to receipt of the authentication information, allow communication between the server and the device that includes a second set of interactions, the second set of interactions including at least the first set of interactions.

Example 21 can include, or can optionally be combined with the subject matter of one or any combination of Examples 18 through 20, to optionally include a plurality of instructions that in response to being executed on a computing device, cause the computing device to: receive, at the server, an initial communication including the provisioning identifier.

Example 22 can include, or can optionally be combined with the subject matter of Example 21, wherein the device had not previously communicated with the server prior to the initial communication.

Example 23 can include, or can optionally be combined with the subject matter of one or any combination of Examples 18 through 22 wherein the device cannot provide uniquely identifying information.

Example 24 can include, or can optionally be combined with the subject matter of one or any combination of Examples 18 through 23 wherein the device lacks uniquely identifying information.

Example 25 can include, or can optionally be combined with any portion or combination of any portions of any one or more of Examples 1-24 to include, subject matter that can include means for performing any one or more of the functions of Examples 1-24, or a machine-readable medium including instructions that, when performed by a machine, cause the machine to perform any one or more of the functions of Examples 1-24. Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for automatically provisioning a device comprising:
receiving a provisioning identifier from the device at a server, the device and the server both being coupled to a network;
restricting communication between the server and the device, while the device is not authenticated, to a first set of interactions to at least one of: provision the device, authenticate the device, retrieve data from the server in a limited manner, and store data on the server in a limited manner;
generating a unique identifier associated with the provisioning identifier for the device; and
transmitting the unique identifier to the device;
notifying a user about the device as a result of the generation of the unique identifier;
requesting authentication information from the user for the device;

receiving authentication information about the device from the user at the server; and in response to receiving the authentication information, allowing communication between the server and the device that includes a second set of interactions, the second set of interactions including at least the first set of interactions.

2. The method of claim 1, comprising:
receiving, at the server, an initial communication including the provisioning identifier.

3. The method of claim 2, wherein the device had not previously communicated with the server prior to the initial communication.

4. The method of claim 1, wherein the device cannot provide uniquely identifying information.

5. The method of claim 1, wherein the device lacks uniquely identifying information.

6. A machine-to-machine provisioning system comprising:
a server coupled to a network; and
a plurality of devices configured to communicate over the network, each of the plurality of devices including a common provisional identifier and a provisioning module configured to communicate with the server;
the server being configured to:
restrict communication between the server and each of the plurality of devices to a first set of interactions to at least one of: provision each of the plurality of devices, authenticate each of the plurality of devices, retrieve data from the server in a limited manner, and store data on the server in a limited manner,
generate a unique identifier for an individual one of the plurality of devices in response to receiving the common provisional identifier from the individual one of the plurality of devices,
transmit the unique identifier to the individual one of the plurality of devices, and request authentication of the individual one of the plurality of devices from a user;
notify a user about the individual one of the plurality of devices as a result of the generation of the unique identifier;
receive authentication information about the individual one of the plurality of devices from the user at the server; and
in response to receiving the authentication information, allow communication between the server and the individual one of the plurality of devices that includes a second set of interactions, the second set of interactions including at least the first set of interactions.

7. The system of claim 6, wherein the server is configured to generate the unique identifier in response to an initial communication from the individual one of the plurality of devices including the provisioning identifier.

8. The system of claim 6, wherein the plurality of devices cannot provide uniquely identifying information.

9. The system of claim 6, wherein the plurality of devices lack uniquely identifying information.

10. A method for distributing computer readable software to multiple devices, comprising:
providing a software application to a server, the server being coupled to a network and configured to provide the software application to a plurality of client devices over the network, the software application including a provisioning identifier and the software application configured to restrict communication between the server and each of the plurality of client devices, while each client device is not authenticated, to a first set of interactions to do at least one of: provision each client device, authenticate each client device, retrieve data from the server in a limited manner, and store data on the server in a limited manner;
receiving a provisioning request from the software application executing on an individual client device, the provisioning request including the provisioning identifier;
generating a unique identifier for the individual client device in response to the provisioning request from the individual client device;
providing the unique identifier to the individual client device;
requesting an authentication of the individual client device;
notifying a user about the individual client device as a result of the generation of the unique identifier;
receiving authentication information about the individual client device from the user at the server; and
in response to receiving the authentication information, allowing communication between the server and the individual client device that includes a second set of interactions, the second set of interactions including at least the first set of interactions.

11. The method of claim 10, wherein the plurality of client devices cannot provide uniquely identifying information.

12. The method of claim 10, wherein the plurality of client devices lack uniquely identifying information.

13. The method of claim 10, wherein the software application cannot access uniquely identifying information in the plurality of client devices.

14. A non-transitory tangible computer readable medium comprising a plurality of instructions that in response to being executed on a computing device, cause the computing device to:
receive a provisioning identifier from the device, the device and the server both being coupled to a network;
restrict communication between the server and the device, while the device is not authenticated, to a first set of interactions to do at least one of: provision the device, authenticate the device, retrieve data from the server in a limited manner, and store data on the server in a limited manner;
generate a unique identifier associated with the provisioning identifier for the device;
transmit the unique identifier to the device;
notify a user about the device as a result of the generation of the unique identifier;
request authentication information from the user for the device;
receive authentication information about the device from the user at the server; and
in response to receiving the authentication information, allow communication between the server and the device that includes a second set of interactions, the second set of interactions including at least the first set of interactions.

15. The non-transitory tangible computer readable medium of claim 14, comprising a plurality of instructions that in response to being executed on the computing device, cause the computing device to:
receive, at the server, an initial communication including the provisioning identifier.

16. The non-transitory tangible computer readable medium of claim 15, wherein the device had not previously communicated with the server prior to the initial communication.

17. The non-transitory tangible computer readable medium of claim 14, wherein the device cannot provide uniquely identifying information.

18. The non-transitory tangible computer readable medium of claim 14, wherein the device lacks uniquely identifying information.

\* \* \* \* \*